United States Patent
Gupta et al.

(10) Patent No.: US 6,434,823 B1
(45) Date of Patent: Aug. 20, 2002

(54) METHOD FOR REPAIRING A COATED ARTICLE

(75) Inventors: Bhupendra Kumar Gupta, Cincinnati; Wayne Ray Grady, Fairfield; Nripendra Nath Das, West Chester, all of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/685,262

(22) Filed: Oct. 10, 2000

(51) Int. Cl.$^7$ .................................................. B23P 15/00
(52) U.S. Cl. ................... 29/889.1; 29/889.7; 29/402.18
(58) Field of Search ............................ 29/889.1, 889.7, 29/402.18, 402.03, 402.06, 402.11; 134/12, 13, 19; 427/252, 253; 416/241 R

(56) References Cited

U.S. PATENT DOCUMENTS

| | | | |
|---|---|---|---|
| 4,098,450 A | | 7/1978 | Keller et al. ................. 228/119 |
| 4,188,237 A | | 2/1980 | Chasteen ........................ 134/2 |
| 4,405,379 A | | 9/1983 | Chasteen ........................ 134/2 |
| 4,775,602 A | * | 10/1988 | Rasch ...................... 29/402.18 |
| 5,071,486 A | * | 12/1991 | Chasteen ........................ 134/2 |
| 5,169,689 A | * | 12/1992 | Thompson et al. ...... 427/372.2 |
| 5,403,669 A | * | 4/1995 | Gupta et al. ................. 428/550 |
| 5,419,971 A | * | 5/1995 | Skelly et al. ................. 428/612 |
| 5,558,922 A | * | 9/1996 | Gupta et al. ................. 29/889.1 |
| 5,614,054 A | | 3/1997 | Reeves et al. ............... 156/344 |
| 5,681,616 A | * | 10/1997 | Gupta et al. ................. 427/264 |
| 5,723,078 A | * | 3/1998 | Nagaroj et al. ........... 29/402.18 |
| 5,728,227 A | | 3/1998 | Reverman ....................... 134/2 |
| 5,771,577 A | * | 6/1998 | Gupta et al. ........... 29/889.721 |
| 5,817,371 A | * | 10/1998 | Gupta et al. ................. 427/454 |
| 6,020,075 A | * | 2/2000 | Gupta et al. ................. 428/612 |
| 6,039,810 A | * | 3/2000 | Mantkowski et al. | |
| 6,146,696 A | * | 11/2000 | Das et al. ..................... 427/253 |
| 6,168,874 B1 | * | 1/2001 | Gupta et al. ............. 416/241 R |
| 6,174,448 B1 | * | 1/2001 | Das et al. ....................... 216/2 |
| 6,254,997 B1 | * | 7/2001 | Rettig et al. ............. 416/241 R |

* cited by examiner

*Primary Examiner*—I Cuda Rosenbaum
(74) *Attorney, Agent, or Firm*—David L. Narciso; Lee H. Sachs

(57) ABSTRACT

A method is provided for repairing an article having a fissure in a metallic overlay environmental resistant coating that includes the element Al, for example an overlay coating of the MCrAlY type. The method depletes more than about 90 wt. % of the Al from an exposed coating surface within the fissure and from a coating outer surface adjacent the fissure, to a depth of at least about 7 mils, without removal of the coating and while substantially maintaining the coating thickness. Thereafter, the fissure is repaired.

6 Claims, 1 Drawing Sheet

METHOD FOR REPAIRING A COATED ARTICLE

BACKGROUND OF THE INVENTION

This invention relates to the repair of articles coated with a metallic environmental resistant overlay type coating of an alloy including aluminum. More particularly, it relates to a method for repairing a surface connected fissure in an article, for example a turbine engine component coated with an overlay coating.

Surfaces of certain components of gas turbine engines operating at relatively high temperatures in oxidizing and corrosive conditions generally are protected with an environmental resistant coating or coating system. Such components, made of a high temperature superalloy based on at least one of Fe, Co, or Ni, include blading type members, for example turbine blades, vanes, nozzles and/or struts, as well as shrouds, which include a coated surface. A frequently used and widely reported commercially available type of metallic environmental resistant coating including the element Al, and sometimes referred to as an overlay coating, is the M—Al or M—Cr—Al base coating. In that type of coating, "M" is Fe, Co, Ni, or their combinations. In some forms, the coating can include one or more additional elements such as Y, Hf, rare earth elements, etc. Such an overlay coating is described in many U.S. Patents including U.S. Pat. No. 4,117,179—Jackson et al. (patented Sep. 26, 1978).

Such metallic overlay type of coating differs from the frequently used and widely reported diffusion aluminide type of coating, for example the commercially available Codep aluminide coating, in the chemical compositions of their outer portions as well as of their diffusion zones generated beneath such coatings. One major difference is in the amount of Al in the respective diffusion layer or zone generated beneath the coatings. For example, about 30–35 wt. % Al can be found beneath an outer or additive portion of a diffusion aluminide coating compared with about 6–15 wt. % Al beneath an overlay coating.

As a result of service operation under such strenuous conditions in a gas turbine engine, fissures, sometimes referred to as cracks, breaks, or openings, have been observed in the outer surface of the above described type of metallic overlay environmental resistant coating. Such a fissure has been observed to extend from the overlay coating outer surface generally inwardly through such coating and toward a substrate of an article. This exposes the overlay coating at its surface within the fissure. Because such components of gas turbine engines are costly to manufacture, it is preferable to repair rather than replace the component, even if the fissure extends into the substrate and requires repair such as welding or brazing.

Some currently used repair methods include complete removal of the metallic environmental resistant coating, for example by mechanical means such as through use of abrasive materials or chemical means such as aqueous acid solutions, typically a mixture of nitric and phosphoric acids. One reason such removal has been conducted is that the presence of Al in the surface to be repaired has been observed to be detrimental to repair methods including at least one of welding, brazing and application of a replacement coating. However, such methods of stripping a metallic coating, particularly one that includes an inner diffusion zone, can result in removal of substrate material to an amount below a dimension requirement of the article. For example, such removal of a metallic environmental resistant coating from the outer wall of an air cooled blading member can result in reduction in wall thickness to below allowable design thickness and/or increase in the size of surface connected airflow openings, detrimentally changing cooling airflow.

In another method described in U.S. Pat. No. 5,728,227—Reverman, Al is depleted from a coating inner portion of a coating diffused with a substrate. The inner diffused portion is exposed by mechanically removing a coating outer portion to enable Al to be depleted from the coating inner portion.

BRIEF SUMMARY OF THE INVENTION

The present invention, in one form, provides a method for repairing an article including a metallic overlay environmental resistant alloy coating including Al without removing the coating. The coating, which has a coating thickness, has therein a fissure extending from a coating outer surface generally toward an article substrate, the coating having an exposed coating surface within the fissure. The method includes depleting an amount of more than about 90 wt. % of the Al from the exposed coating surface within the fissure and from the outer surface of the coating at least adjacent the fissure. Such Al is depleted to a depth of at least about 7 mils from the exposed coating surface within the fissure and from the coating outer surface, without removal of the coating and while substantially maintaining the coating thickness.

After such preparation, the fissure is repaired.

BRIEF DESCRIPTION OF THE DRAWING

The drawing is a fragmentary sectional view of a coated wall of an article including a fissure through the coating and extending into the substrate.

DETAILED DESCRIPTION OF THE INVENTION

Figure 1:
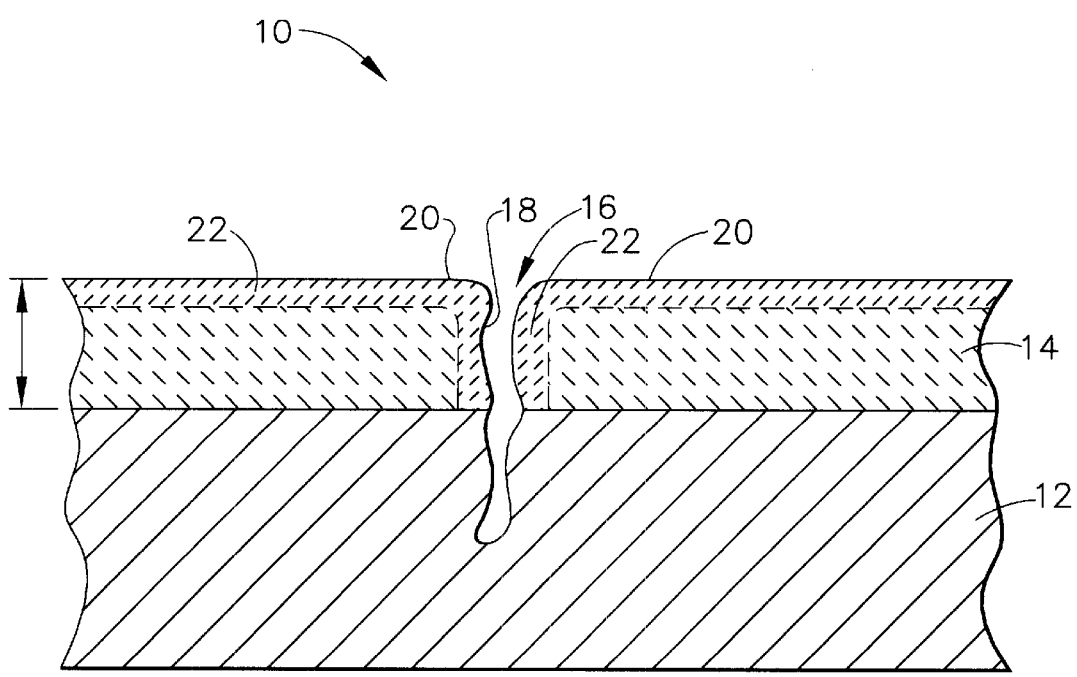

The presence of detrimental amounts of 10 wt. % or more of Al in a surface to be repaired, for example by at least one of welding, brazing, and replacement coating, can result in the formation of excessive aluminum oxide on a surface during repair. Presence of such amounts of an oxide has been observed to inhibit effective repair and/or coating. It has been known to remove surface oxides formed during service operation on a surface or within a surface connected opening. One example of such surface oxide removal or attack is through use of a hydrohalogen, typically HF. This general type of surface oxide removal or attack has been widely described in the art in such U.S. Patents as U.S. Pat. No. 4,098,450—Keller et al.; U.S. Pat. Nos. 4,188,237 and 4,405,379—Chasteen; U.S. Pat. No. 5,614,054—Reeves et al.; and in an article "The HF 'Fluoride-Ion' Cleaning Technique for Superalloys" By Louis F. Pocket and Alfred L. Clavel, Ti-Coating, Inc., Mt. Clemens, Mich. 48045, pages 1–6. In addition, in U.S. Pat. No. 5,728,227—Reverman, a halogen gas has been included in a reducing gas to deplete Al from an inner diffusion zone beneath a coating outer portion that first is mechanically removed to expose the diffusion zone.

The present invention provides a method for depleting more than about 90 wt. % Al from an exposed surface of an overlay type coating within a fissure in the coating substantially without removal of the overlay coating or dimensional change of the coating. The presence of at least about 10 wt. % Al in such a coating surface to be repaired can form detrimental amounts of aluminum oxide, interfering with repair including at least one of welding, brazing and recoating. The fragmentary sectional view of the drawing shows one example of use of the present invention.

In the embodiment of the drawing, an article is shown generally at 10 in the form of a wall, for example an airfoil wall of a gas turbine engine blading member. Article 10 includes a substrate 12, for example a Ni base superalloy, and an overlay type coating 14, for example a commercial NiCrAlY alloy, disposed on substrate 12. A fissure or crack shown generally at 16 has developed within coating 14 as a result of service operation and extends through coating 14 into substrate 12. Formation of fissure 16 has exposed coating surface 18 of coating 14 within fissure 16.

Generally as a result of high temperature exposure, surface oxides of certain elements in coating 14 will form on surface 18 of fissure 16 as well as on coating outer surface 20 of coating 14. Practice of the method of the present invention can be used to remove such surface oxides, as described in the art. However, in addition, the present invention can deplete more than about 90 wt. % Al from the exposed coating surface 18 prior to repair, for the reasons discussed above, substantially without removal or dimensional change in the coating. A form of the present invention shown in the drawing depletes such Al from within exposed coating surface 18 within fissure 16 and from coating outer surface 20 adjacent fissure 16 to avoid formation of detrimental amounts of aluminum oxide at such surfaces during repair of fissure 16. Such repair can include welding or brazing to close or heal fissure 16, as well as repair of coating 14 by application of a replacement coating at least at the vicinity of fissure 16. According to that form of the invention, a zone 22 depleted of more than 90 wt. % Al to a depth of at least about 7 mils is provided within exposed coating surface 18 within fissure 16, and within surface 20 of coating 14 at least adjacent fissure 16. It has been recognized that such depth of zone 22 is required to enable repair of the article without formation of detrimental aluminum oxide at surfaces 18 and 20.

In one evaluation of the method of the present invention, an article in the form of an air cooled turbine nozzle guide vane made of a Ni base superalloy commercially available as Mar M 247 alloy included an airfoil wall coated with an environmentally resistant overlay coating of the MCrAlY type. After service operation, it was observed that a fissure had developed at the airfoil wall, through the overlay coating and into the substrate alloy, as shown in the drawing. The airfoil required repair by brazing and recoating. However, the presence during brazing of relatively large amounts of Al, at 10 wt. % or more, in the exposed coating surface within the fissure and in the coating outer surface adjacent the fissure, has been observed to form detrimental amounts of aluminum oxide that will inhibit effective brazing to heal the fissure.

According to a form of the present invention, in this evaluation the airfoil surface first was treated with a light grit blast using 240 mesh size particles of aluminum oxide to remove surface deposits including dirt, non-metallic deposits and loose surface oxides formed or deposited during service operation. Then the airfoil, including the fissure, was exposed to a gas including about 6–10 wt. % HF gas, with the balance essentially hydrogen gas at a temperature in the range of about 1800–1900° F. for a time in the range of about 2–8 hours. This was sufficient to deplete more than about 90 wt. % Al from the exposed MCrAlY overlay coating surface within the fissure and the overlay coating outer surface at least adjacent the fissure to a depth of at least about 7 mils without change in dimensions of the article. Then the fissure was healed successfully by brazing in a manner commercially used in the art and sometimes called Activated Diffusion Healing process, using SA-650 repair alloy, to provide a healed surface. Thereafter, a replacement aluminide coating was applied to the healed airfoil by the commercial Vapor Phase Aluminide (VPA) process conducted at about 1975° F. for about 6 hours using CrAl pellets as the source of Al.

In another evaluation of the method of the present invention, an air cooled turbine nozzle vane of the substrate alloy and environmental resistant overlay coating as described above and including a fissure through the coating into the substrate was repaired. The method included the first light grit blasting and exposure to the gaseous combination of Hf and hydrogen as described above. However, because of a greater thickness of the MCrAlY overlay coating and a fissure extended greater than about 10 mils, thereafter a second light grit blast of the same type was applied to remove surface products formed during the first exposure to the gas, and a second exposure to the gaseous combination, distinct from the first exposure to the gaseous combination, was conducted. Then vacuum cleaning was conducted to remove any deposits from such treatment.

After the second exposure to the gaseous combination and vacuum cleaning, the fissure was healed by brazing as described above. Then repair of the healed airfoil was completed by coating with a PtAl type coating as a replacement coating by first electrodepositing about 0.3 mils of Pt on the surface and then conducting the above described VPA process.

For some applications, a ceramic thermal barrier coating (TBC), for example one well known and used in the art based on zirconia modified with yttria, can be applied as an outer coating over the replacement coatings described above. Forms of such a TBC include plasma vapor deposited TBC and air plasma deposited TBC.

The present invention has been described in connection with specific examples and combinations. However, it should be understood that they are intended to be typical of rather than in any way limiting on the scope of the present invention. Those skilled in the art will understand that the invention is capable of variations and modifications without departing from the scope of the appended claims.

What is claimed is:

1. In a method for repairing an article including a metallic overlay environmental resistant alloy coating including Al, the coating having a coating thickness and including therein a fissure extending from a coating outer surface generally toward an article substrate and having an exposed coating surface within the fissure, the steps of:

depleting an amount of more than about 90 wt. % of the Al from the exposed coating surface within the fissure and from the coating outer surface at least adjacent the fissure to a depth of at least about 7 mils from the exposed coating surface within the fissure and from the coating outer surface without removal of the entire coating and while substantially maintaining the coating thickness; and thereafter, repairing the fissure.

2. The method of claim 1 in which the depleting of Al is conducted by contacting the exposed coating surface and the coating outer surface with a hydrohalogen gas for a first time sufficient to deplete the amount of Al to the depth but less than a second time that will remove other ingredients of the coating.

3. The method of claim 2 in which the fissure extends greater than about 10 mils, wherein the depleting was conducted in at least a pair of distinct contacts with the hydrohalogen gas.

4. The method of claim 2 for repairing an article for a turbine engine, the article made of a high temperature superalloy based on at least one element selected from the group consisting of Fe, Co, and Ni, the coating being an MCrAl base overlay coating, in which M is at least one element selected from the group consisting Fe, Co, and Ni, wherein depleting is conducted by:

contacting the exposed coating surface and the coating outer surface with a mixture of gases including about 6–10 wt. % HF gas, with the balance essentially hydrogen gas at a temperature in the range of about 1800–1900° F. for a time in the range of about 2–8 hours.

5. The method of claim 4 for repairing an airfoil wall of a service operated gas turbine engine blading member coated with an MCrAlY base overlay coating, wherein:

the airfoil surface, prior to contacting with the mixture of gases, is treated with a light grit blast to remove surface deposits formed during service operation;

the exposed coating surface and the coating outer surface are contacted with the mixture of gases;

the wall is healed by brazing to provide a healed surface; and thereafter, a replacement aluminide coating is applied to the healed surface.

6. The method of claim 5 in which the fissure extends greater than about 10 mils, wherein after the exposed coating surface and the coating outer surface are contacted with the mixture of gases and before the wall is healed:

the airfoil surface is treated with a light grit blast to remove any surface deposits; and then, the exposed coating surface and the coating outer surface again are contacted with the mixture of gases.

\* \* \* \* \*